J. R. LITTLE.
Mechanical Movement.

No. 206,184. Patented July 23, 1878.

Witnesses.
S. N. Piper
John Renow

Inventor.
J. Russell Little.
by his attorney.
R. H. Coll

UNITED STATES PATENT OFFICE.

J. RUSSELL LITTLE, OF JAMAICA PLAIN, BOSTON, MASSACHUSETTS.

IMPROVEMENT IN MECHANICAL MOVEMENTS.

Specification forming part of Letters Patent No. 206,184, dated July 23, 1878; application filed June 27, 1878.

*To all whom it may concern:*

Be it known that I, J. RUSSELL LITTLE, of Jamaica Plain, of the city of Boston, of the county of Suffolk and State of Massachusetts, have invented a new and useful mechanical movement or mechanism for revolving one shaft by means of another at right angles thereto; and do hereby declare the same to be described in the following specification and represented in the accompanying drawings, of which—

Figure 1:
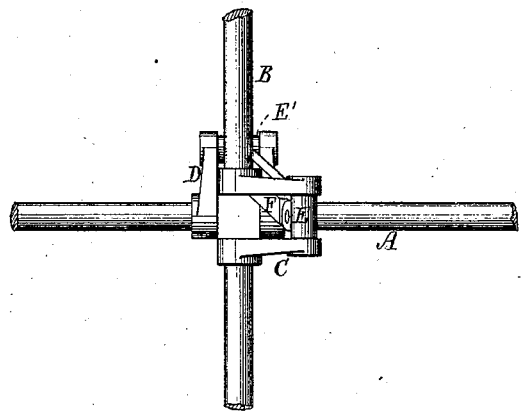
Figure 2:
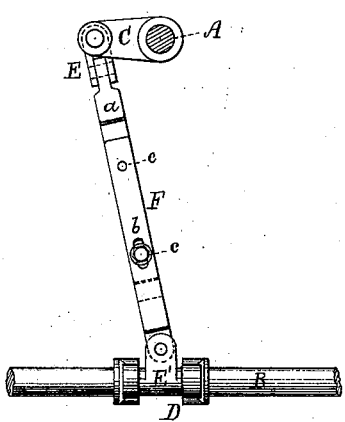
Figure 3:
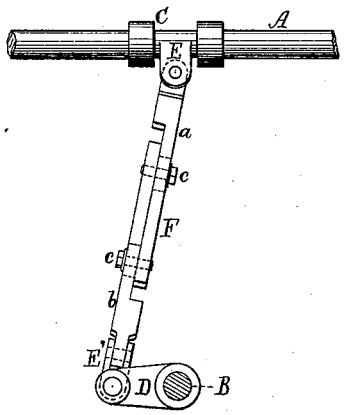

Figure 1 is a top view, and Figs. 2 and 3 side elevations, of two shafts provided with my invention.

The said shafts (shown at A and B) are exhibited as disposed at right angles to each other, and one above the other, each being provided with one of two bell-cranks, C D.

The wrist of each crank is furnished with a clasp or swivel, E or E', applied to it, so as to revolve thereon, and the two clasps or swivels are pivoted to a connecting-link, F, which, for convenience of lengthwise adjustment or being elongated or diminished in length, may be in two parts, *a b*, lapped on each other, and connected by one or more headed clamp-screws, *c*, each of which should have its shank extending through a slot in one and screwed into the other of such parts. The axes of the pivots or hinges of the link and swivels are at right angles, though one is above the other. By revolving either shaft, the other, by means of the cranks, swivels, and links, will be simultaneously revolved.

From the above it will be seen that my invention is specially serviceable in enabling one shaft to be revolved by another when the axes of the two are at right angles, but not in the same plane with each other.

When two shafts are to be coupled by bevel-gears, so as to cause one of such shafts, when in revolution, to revolve the other by means of such gears, the two shafts are generally in, or have to be in, the same plane with each other, so that if prolonged they would meet; but with my invention two shafts may be disposed at right angles, but not in the same plane, and be connected so as to cause one, when revolved, to revolve the other by the connecting mechanism.

By having the rigid connecting-link made in two parts, lapped on each other, and provided with one or more devices for confining them together at the laps and allowing of elongation and contraction of the link, as set forth, lengthwise adjustment of the link may be effected from time to time to the swivels, as wear of the parts or occasion may require.

My shaft-connecting mechanism may be made and its parts be adjusted so as to work with little or no noise, which, besides other advantage, as stated, renders it often preferable to bevel-gears as a means of connecting two shafts, so as to cause one while in revolution to revolve the other.

What I claim as my invention is—

1. The combination of the two cranks, the swivels, and the connecting-link, arranged and applied substantially as described.

2. In combination with the two cranks and the swivels, arranged and pivoted together as described, the connecting-link pivoted to the swivels, and constructed so as to be capable of lengthwise adjustment, as explained.

3. In combination with two shafts, arranged and provided with cranks, as set forth, the two swivels and their connecting-link pivoted together and to the wrists of the cranks, all being essentially as specified.

J. RUSSELL LITTLE.

Witnesses:
R. H. EDDY,
JOHN R. SNOW.